(12) United States Patent
Ryu

(10) Patent No.: US 11,927,778 B2
(45) Date of Patent: Mar. 12, 2024

(54) VARIABLE LIGHT TRANSMITTANCE ELEMENT, AND COLOR FILTER AND SMART WINDOW FOR DISPLAY DEVICE COMPRISING SAME

(71) Applicant: RMK INC., Sejong (KR)

(72) Inventor: Min Ki Ryu, Sejong (KR)

(73) Assignee: RMK INC., Sejong (KR)

( * ) Notice: Subject to any disclaimer, the term of this patent is extended or adjusted under 35 U.S.C. 154(b) by 520 days.

(21) Appl. No.: 17/297,069

(22) PCT Filed: Nov. 15, 2019

(86) PCT No.: PCT/KR2019/015635
§ 371 (c)(1),
(2) Date: May 26, 2021

(87) PCT Pub. No.: WO2020/111608
PCT Pub. Date: Jun. 4, 2020

(65) Prior Publication Data
US 2022/0026606 A1   Jan. 27, 2022

(30) Foreign Application Priority Data

Nov. 29, 2018   (KR) .......................... 10-2018-0151130

(51) Int. Cl.
*G02B 5/00*   (2006.01)
*G02B 5/08*   (2006.01)
*G02B 5/28*   (2006.01)

(52) U.S. Cl.
CPC ............. *G02B 5/008* (2013.01); *G02B 5/085* (2013.01); *G02B 5/28* (2013.01); *G02B 2207/101* (2013.01)

(58) Field of Classification Search
CPC .......... G02B 5/008; G02B 5/085; G02B 5/28; G02B 2207/101
(Continued)

(56) References Cited

U.S. PATENT DOCUMENTS

| 2007/0007538 | A1 | 1/2007 | Ono et al. | |
| 2011/0116168 | A1* | 5/2011 | Nikoobakht | ........... G02B 26/02 977/932 |

FOREIGN PATENT DOCUMENTS

| JP | 2007-079532 A | 3/2007 |
| KR | 10-2008-0002257 A | 1/2008 |

(Continued)

*Primary Examiner* — William Choi
(74) *Attorney, Agent, or Firm* — KORUS Patent, LLC; Seong Il Jeong

(57) ABSTRACT

The present invention relates to a variable light transmittance element including a variable light transmittance structure, wherein the variable light transmittance structure includes: a first electrode; a variable light transmittance layer made of a transparent semiconductor material in which metal nanoparticles are dispersed, and electrically connected to the first electrode; a second electrode; and an insulating layer interposed between the variable light transmittance layer and the second electrode, and also relates to a color filter for a display device and smart window including the same. The variable light transmittance element according to the present invention induces a change in the localized surface plasmon resonance (LSPR) state by applying a voltage to both ends of the variable light transmittance stack structure including the electrode/insulation layer/metal nanoparticle-containing transparent semiconductor layer, and thus the light transmittance and color of the metal nanoparticle-containing transparent semiconductor layer may be freely changed.

27 Claims, 9 Drawing Sheets

(58) Field of Classification Search
USPC .......................................................... 359/240
See application file for complete search history.

(56) References Cited

FOREIGN PATENT DOCUMENTS

| KR | 10-2014-0118508 A | 10/2014 |
| KR | 10-2015-0125051 A | 11/2015 |
| KR | 10-2016-0117326 A | 10/2016 |
| KR | 10-1891208 B1 | 8/2018 |

* cited by examiner

VARIABLE LIGHT TRANSMITTANCE ELEMENT, AND COLOR FILTER AND SMART WINDOW FOR DISPLAY DEVICE COMPRISING SAME

TECHNICAL FIELD

The present invention relates to a variable light transmittance element and a color filter for a display device and smart window including the same, and more particularly to a variable light transmittance element including metal nanoparticles, and a color filter for a display device and smart window including the same.

BACKGROUND ART

When a transparent non-conductive medium contains metal nanoparticles, it can have color. This is attributable to a phenomenon called localized surface plasmon resonance (LSPR). In brief, free electrons inside metal nanoparticles interact with the electric field of light (electromagnetic waves), in which case light of a specific wavelength at which resonance occurs is absorbed and scattered to give color as a whole. In addition, this color may vary depending on the size, spacing, or shape of the metal nanoparticles. An example thereof is the stained glass of a European castle or cathedral. The analysis of the stained glass shows that the glass contains very small gold (Au) particles. The color of stained glass varies depending on the size or density (interval) of the gold particles. Therefore, in order to take advantage of this phenomenon, in the existing studies, apparent color is changed mainly by adjusting the interval between metal particles based on the size of the metal nanoparticles or by diversifying the shape using a special synthesis technique.

Meanwhile, a liquid crystal display device may include a color filter substrate, an array substrate (a TFT array substrate), and a liquid crystal layer formed between the color filter substrate and the array substrate. Since the process of manufacturing the liquid crystal display device basically requires a number of mask processes, i.e., photolithography processes, a method of reducing the number of masks is required in terms of manufacturing efficiency. A color filter used in the liquid crystal display device uses dyes or pigments to absorb and dissipate light of unnecessary color and to transmit only light of the desired color and realize the color. Accordingly, the color filter transmits only one of the three primary colors of RGB in the white light incident based on one sub-pixel. As a result, in the color filter layer, it may be difficult to have a transmittance of 30(%) or more. For this reason, the transmission efficiency of a panel (an LCD panel) is very low, and thus power consumption caused by a backlight may increase. In addition, the color filter may require a complicated process because the process of applying, exposing, developing, and curing a color resist for each primary color is repeatedly performed.

DISCLOSURE

Technical Problem

The technical problem to be solved by the present invention is to provide a variable light transmittance element that includes a structure based on an LSPR phenomenon, thus being applicable to various transparent information display devices as well as existing color filters having the above-described problems.

Technical Solution

In order to overcome the above-described technical problem, the present invention proposes a variable light transmittance element including a variable light transmittance structure, wherein the variable light transmittance structure includes: a first electrode; a variable light transmittance layer made of a transparent semiconductor material in which metal nanoparticles are dispersed, and electrically connected to the first electrode; a second electrode; and an insulating layer interposed between the variable light transmittance layer and the second electrode.

Furthermore, there is proposed the variable light transmittance element, wherein the transparent semiconductor material is one or more oxides selected from Zn, In and Sn.

Furthermore, there is proposed the variable light transmittance element, wherein the transparent semiconductor material further comprises at least one element selected from Si, Ge, Al, and Ga.

Furthermore, there is proposed the variable light transmittance element, wherein the metal nanoparticles are one metal or an alloy of two or more metals selected from Au, Ag, Cu, Al, Pt, Pd, Ni, Co, Fe, Mn, Cr, Mo, W, V, Ta, Nb, Hf, Zr, Ti, Zn, In, Sn, Sb, and Bi.

Furthermore, there is proposed the variable light transmittance element, wherein the first and second electrodes are transparent electrodes or reflective electrodes.

Furthermore, there is proposed the variable light transmittance element, wherein the conductivity of the transparent semiconductor material included in the variable light transmittance layer is controlled by applying a voltage to the variable light transmittance stack structure, so that a localized surface plasmon resonance (LSPR) state of the metal nanoparticles is changed, thereby changing light transmittance of the variable light transmittance layer.

Furthermore, there is proposed the variable light transmittance element, further including a transparent semiconductor layer interposed between the variable light transmittance layer and the first electrode.

Furthermore, there is proposed the variable light transmittance element, wherein a substrate is included on one surface of the variable light transmittance structure, the first and second electrodes are transparent electrodes, and a lower coating layer interposed between the variable light transmittance structure and the substrate is further included.

Furthermore, there is proposed the variable light transmittance element, further including a reflective film, wherein the reflective layer is formed on a remaining surface of the variable light transmittance structure or between the variable light transmittance structure and the lower coating layer.

In addition, the present invention proposes a color filter for a display device, the color filter including the variable light transmittance element according to another aspect of the present invention.

In addition, the present invention proposes a smart window including the variable light transmittance element according to another aspect of the present invention.

Advantageous Effects

The variable light transmittance element according to the present invention induces a change in the localized surface plasmon resonance (LSPR) state by applying a voltage to both ends of the variable light transmittance stack structure including the electrode/insulation layer/metal nanoparticle-containing transparent semiconductor layer, and thus the light transmittance and color of the metal nanoparticle-containing transparent semiconductor layer may be freely changed, so that the variable light transmittance element may be used not only for color filters for conventional display devices, but also for transparent information display products such as smart windows, smart glasses, and the like.

BEST MODE

Figure 1:
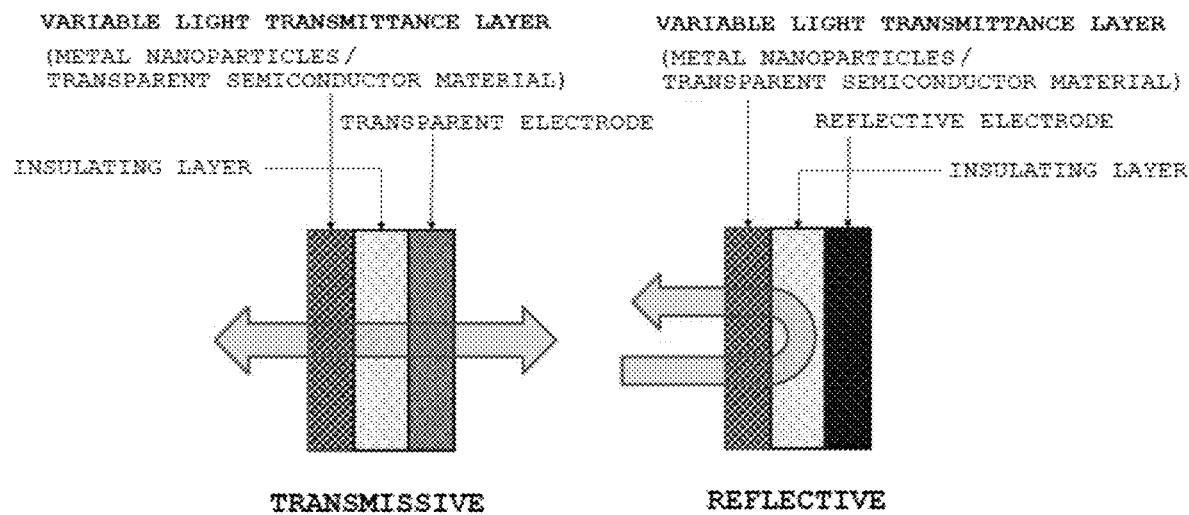
FIG. 1 is a schematic diagram of a variable light transmittance stack structure (transmissive and reflective) included in a variable light transmittance element according to the present invention.

In the following description of the present invention, when it is determined that a detailed description of a related known function or configuration may unnecessarily obscure the subject matter of the present invention, a detailed description thereof will be omitted.

Since embodiments according to the concept of the present invention may be subject to various modifications and have various forms, specific embodiments are illustrated in the drawings and will be described in detail in the present specification or application. However, this is not intended to limit embodiments according to the concept of the present invention to the specific forms disclosed, and it is to be understood that the present invention includes all modifications, equivalents, and substitutes included in the spirit and scope of the present invention.

The terms used in the present specification are only used to describe specific embodiments, and are not intended to limit the present invention. A singular expression includes a plural expression unless the context clearly indicates otherwise. In the present specification, it is to be understood that terms such as "include" or "have" are intended to designate the presence of a set feature, number, step, action, component, part, or combination thereof but the possibility of the presence or addition of one or more other features or numbers, steps, actions, elements, parts, or combinations thereof is not preliminarily excluded.

The embodiments of the present invention will be described in detail below with reference to the accompanying drawings so that those of ordinary skill in the art may easily implement the present invention. The present invention may be implemented in various different forms and is not limited to the embodiments described herein.

As described above, a localized surface plasmon resonance (LSPR) phenomenon is a phenomenon in which when the metal nanoparticles are in a transparent non-conductive medium, they interact with light coming from the outside, so that the light transmittance of the medium is changed, resulting in having a color.

In greater detail, electrons can move freely inside a metal, but cannot move freely in a non-conductive medium. In this situation, when an electric field is applied from the outside, free electrons inside the metal are gathered like a cloud in one direction by the electric field, so that metal nanoparticles have a part having a large number of electrons and a part having a shortage of electrons. Meanwhile, the vibrating electric field of light, which is electromagnetic waves, can cause the movement of free electrons inside the metal nanoparticles. The size, spacing, and shape of metal nanoparticles are related to the wavelengths of the electromagnetic waves that the metal nanoparticles can interact with. If a specific wavelength of the electromagnetic waves of light resonates with electrons of the metal nanoparticles, the specific wavelength may be absorbed and scattered. This phenomenon occurs when metal nanoparticles are surrounded by a non-conductive medium. The reason for this is that free electrons cannot move to the non-conductive medium and are localized inside the metal nanoparticles. However, if the metal nanoparticles are surrounded by a conductive medium, some of the free electrons are not localized inside the metal nanoparticles but can move freely, so that the conditions for interacting with the electric field of the incident light may vary, and thus the wavelength of electromagnetic waves that the metal nanoparticles can interact with may change, with the result that apparent color may be changed.

The variable light transmittance element according to the present invention is based on a core technical spirit in which, based on the above-described LSPR phenomenon, a medium surrounding metal nanoparticles is composed of a transparent semiconductor material and an LSPR state is changed by adjusting the conductivity of the medium so that apparent color is changed the by adjusting light transmittance.

In other words, a free electron region inside a metal is adjusted to a peripheral semiconductor region by introducing metal nanoparticles into a transparent semiconductor material, so that the wavelength of light that can be transmitted is adjusted by changing an effective free electron region. In this case, a method of adjusting the effective electron region is to change the LSPR state by adjusting the conductivity of the medium surrounding the metal nanoparticles through the application of a voltage as an external electric field applicable from the outside, thereby changing the apparent color.

To this end, the variable light transmittance element according to the present invention includes a variable light transmittance structure including a variable light transmittance layer made of a transparent semiconductor material in which metal nanoparticles are dispersed.

More specifically, the variable light transmittance structure includes a first electrode, a variable light transmittance layer made of a transparent semiconductor material in which metal nanoparticles are dispersed and electrically connected to the first electrode, a second electrode, and an insulation layer interposed between the variable light transmittance layer and the second electrode.

The conductivity of the transparent semiconductor material included in the variable light transmittance layer by applying a voltage between the first and second electrodes of the variable light transmittance stack structure, so that the light transmittance of the variable light transmittance layer is changed by changing the LSPR state of the metal nanoparticles, with the result that the apparent color of the variable light transmittance layer is changed.

In this case, the first electrode electrically connected to the variable light transmittance layer and the second electrode for the application of a voltage may be composed of transparent electrodes (ITO transparent electrodes, ITO transparent electrodes including Ag nanowires, or the like) or reflective electrodes (metal electrodes capable of mirror reflection, or the like).

When both the first and second electrodes are composed of transparent electrodes, a transmissive structure is formed as shown in the left view of FIG. 1. When an element including the variable light transmittance structure is applied as a color filter for a display, the variable light transmittance layer may be adjusted to the desired color by adjusting an applied voltage, so that small pixels may be formed compared to existing individual RGB color filters, thereby implementing a display of higher quality. Furthermore, when the corresponding element is used for a transparent display, it may be used as a display having higher transparency, and may be applied to transparent information display devices such as smart windows and smart glasses.

Furthermore, in the case where both the first and second electrodes are configured as reflective electrodes in a 'single-sided' element to be described later, or in the case where the first electrode is configured as a transparent electrode and also the second electrode is configured as a reflective electrode in a 'double-sided' element, a reflective structure is formed, as shown in the right view of FIG. 1.

Meanwhile, the transparent semiconductor material forming the medium of the variable light transmittance layer may preferably be a metal oxide semiconductor material, and the metal oxide semiconductor material may be one or more oxides selected from Zn, In, and Sn.

In addition, the metal oxide semiconductor material may further include at least one element selected from Si, Ge, Al, and Ga. Furthermore, the metal oxide semiconductor material may be in an amorphous state.

For reference, the transparent metal oxide semiconductor may be adjusted to a conductor state and a non-conductor state by using an electric field. Since most oxide semiconductors are n-type semiconductors, conduction charges are electrons. In addition, when a bandgap is about 3 eV, the semiconductor is transparent in the visible light region and there are few holes, which are minority charges. In a metal electrode-insulator-semiconductor (MIS) stack structure, when a voltage is applied to the electrode, the concentration of charges in the semiconductor layer may be controlled by an electric field.

In the MIS structure, when a positive voltage is applied to the electrode, negative charges are induced in the semiconductor layer, and thus electrons, which are main charges in an n-type semiconductor, are filled. Conversely, when a negative voltage is applied to the electrode, electrons, which are main charges, are pushed out of the semiconductor layer and positive charges need be induced. Since there are no positively charged holes in a transparent oxide semiconductor having a wide bandgap, there is formed a depletion layer in which positively charged fixed charges are exhibited. This depletion layer is a non-conductive medium having few conduction charges.

In other words, the electron density of the semiconductor layer may be controlled by adjusting the voltage of the electrode. In this case, when there are metal nanoparticles in the semiconductor layer, the electrical properties of the surrounding medium may change between a conductive medium and a non-conductive medium. If so, the LSPR state may change, and thus the apparent color may change.

Furthermore, the metal nanoparticles dispersed in the transparent semiconductor material of the variable light transmittance layer may be made of one metal or an alloy of two or more metals selected from Au, Ag, Cu, Al, Pt, Pd, Ni, Co, Fe, Mn, Cr, Mo, W, V, Ta, Nb, Hf, Zr, Ti, Zn, In, Sn, Sb, and Bi. However, it is most preferable that the metal nanoparticles be made of Au among them. The reasons for this are as follows.

The conduction band minimum (CBM) of the transparent metal oxide semiconductor is usually about −4.1 eV to −4.4 eV, and the work function of gold is −5.1 eV. When the semiconductor is in a non-conductive state, the difference between these two energies is about 0.7 to 1.0 eV, which may be more stable because it is an energy barrier that is difficult for free electrons to overcome at room temperature. Furthermore, gold can be more stable when it encounters oxygen because it is more difficult to oxidize than silver and copper.

FIGS. 2a to 2h are sectional views of so-called 'single-sided' elements having first and second electrodes simultaneously formed by one patterning process among various sectional structures of the variable light transmittance element according to the present invention.

Figure 2A:
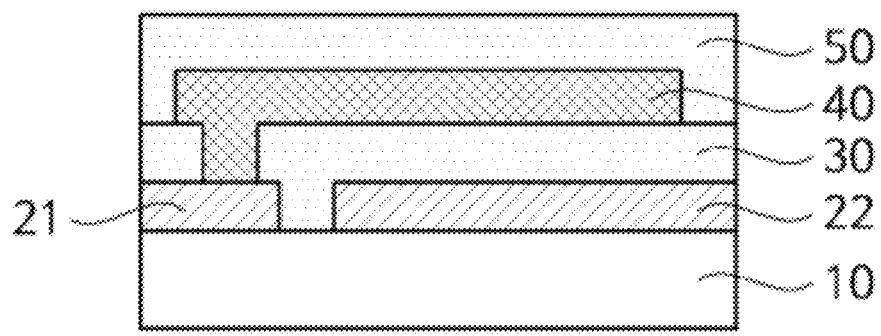
FIGS. 2a to 2h are sectional views of 'single-sided' elements in which first and second electrodes are simultaneously formed by a single patterning process as an example of a variable light transmittance device according to the present invention.

The single-sided element, the section of which is shown in FIG. 2a, is obtained by forming first and second electrodes 21 and 22, i.e., transparent electrodes, through the patterning of transparent electrodes on a substrate 10 made of a transparent material such as glass, PMMA, PC, PET, or the like, forming an insulating pattern 30 corresponding to an insulating layer, and then sequentially forming a variable light transmittance layer 40 and an insulating film 50.

Figure 2B:
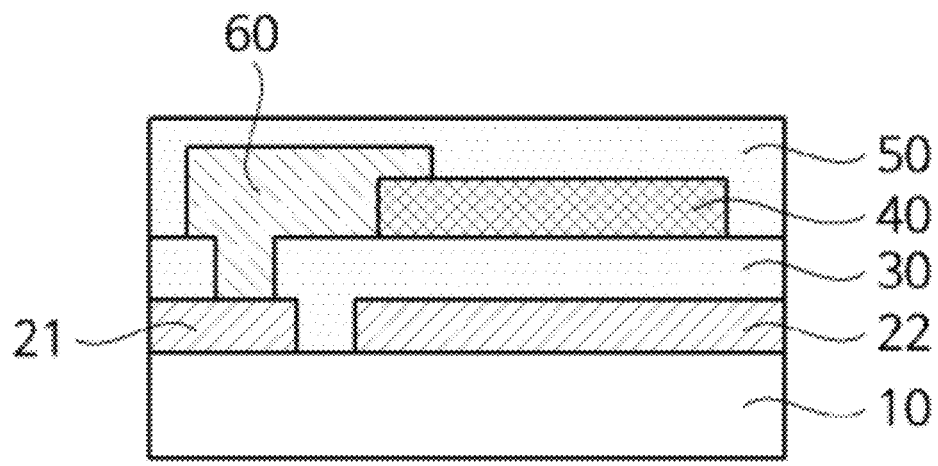

The element, the section of which is shown in FIG. 2b, has a structure that further includes a transparent semiconductor layer 60 interposed between a variable light transmittance layer 40 and a first electrode 21 compared to the element shown in FIG. 2a.

Figure 2C:
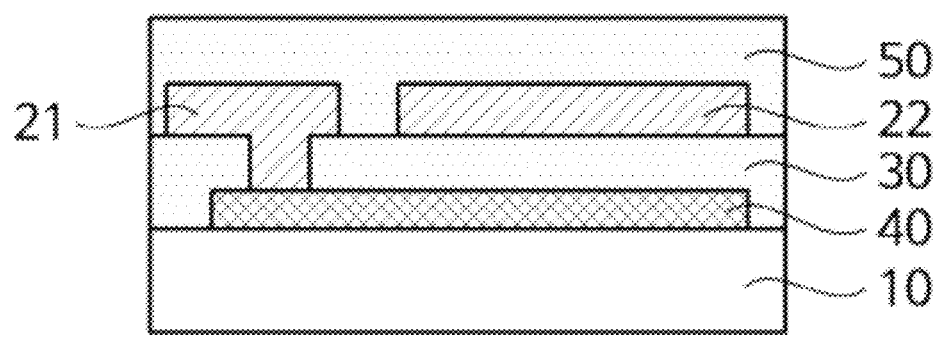

Furthermore, in the element the section of which is shown in FIG. 2c, a second electrode 22 to which a voltage is applied is located above a variable light transmittance layer 40 when a substrate 10 is viewed as the lowermost part, unlike in the element shown in FIG. 2a.

Figure 2D:
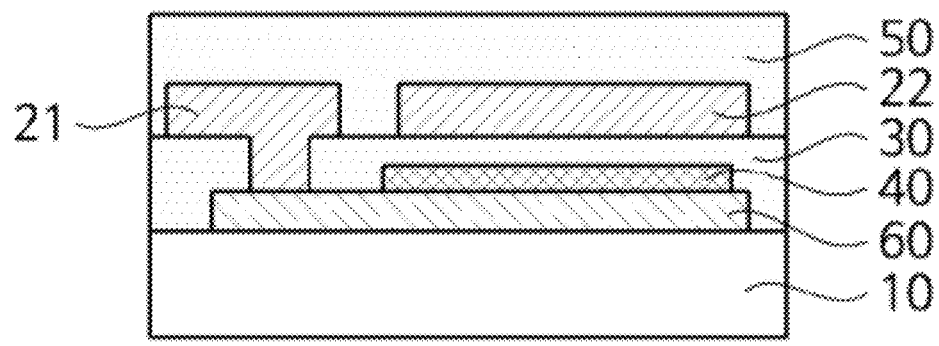
Figure 2E:
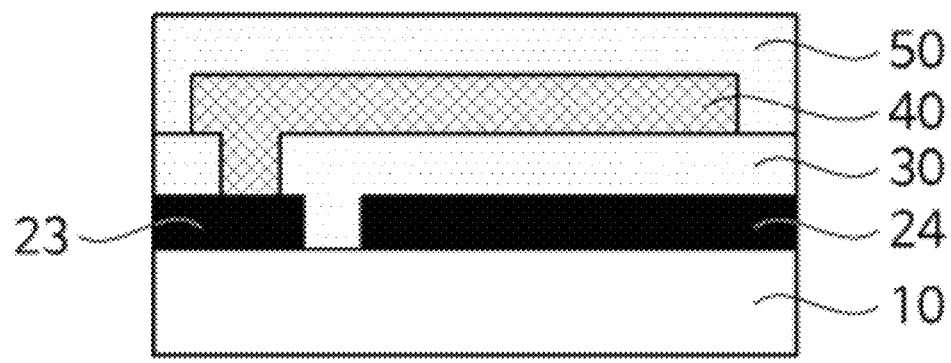
Figure 2F:
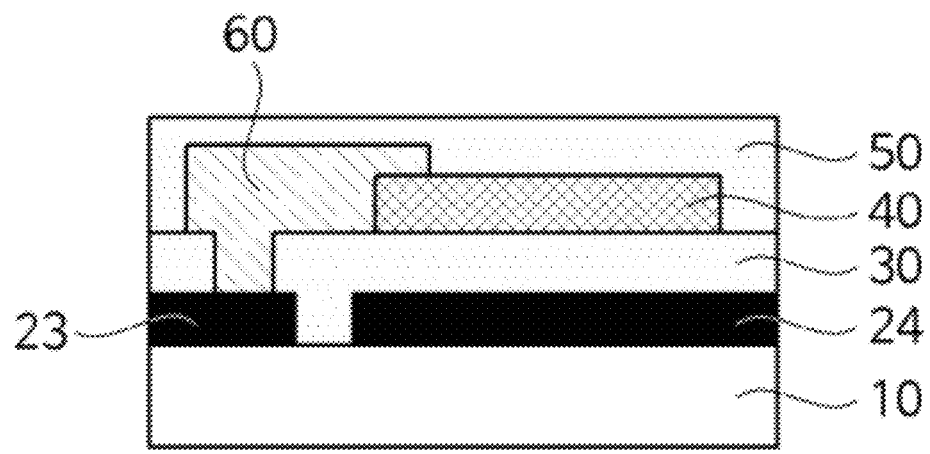
Figure 2G:
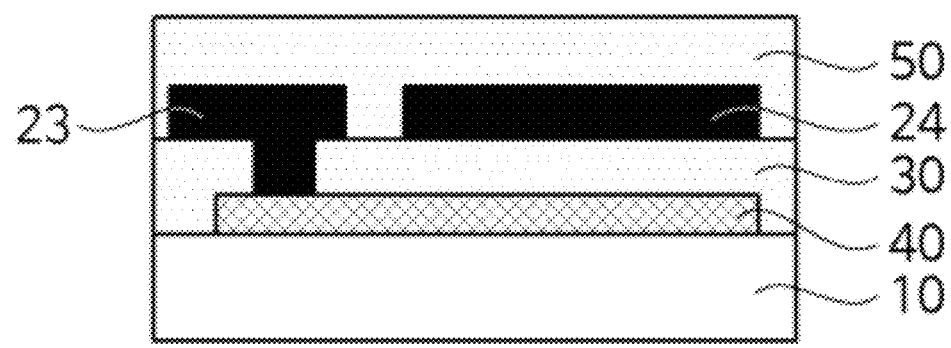
Figure 2H:
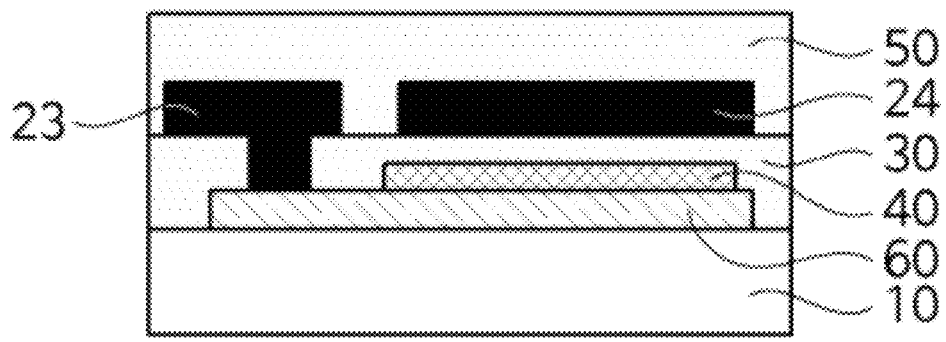

The element, the section of which is shown in FIG. 2d, has a structure that further includes a transparent semiconductor layer 60 interposed between a variable light transmittance layer 40 and a first electrode 21 compared to the element shown in FIG. 2b.

The elements, the sections of which are shown in FIGS. 2e to 2h, are different from the elements shown in FIGS. 2a to 2d in that the former elements have first and second electrodes 23 and 24, i.e., reflective electrodes, as electrodes.

FIGS. 3a to 3f are sectional views of so-called 'double-sided' elements having first and second electrodes formed by separate patterning processes among various sectional structures of the variable light transmittance element according to the present invention.

Figure 3A:
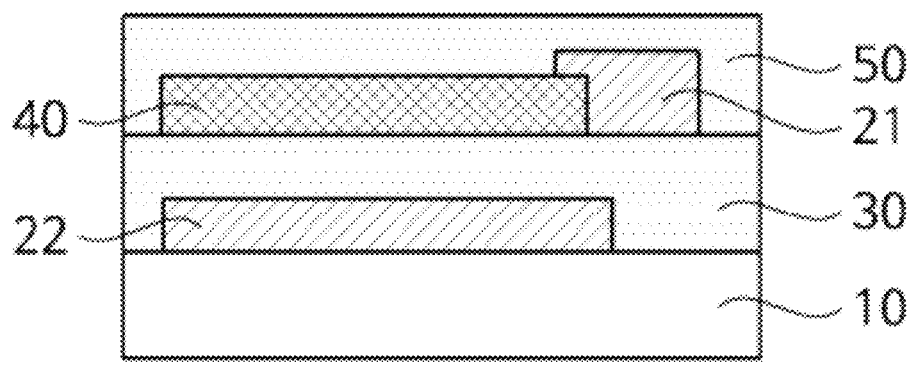
FIGS. 3a to 3f are sectional views of 'double-sided' elements in which first and second electrodes are formed by respective patterning processes as an example of a variable light transmittance device according to the present invention.

The double-sided element, the section of which is shown in FIG. 3a, is obtained by forming a second electrode 22, i.e., a transparent electrode, through the patterning of a transparent electrode on a substrate 10 made of a transparent material such as glass, PMMA, PC, PET, or the like, forming an insulating pattern 30 corresponding to an insulating layer, forming a variable light transmittance layer 40 and a first electrode 21, i.e., a transparent electrode electrically connected to the variable light transmittance layer 40, and finally forming an insulating film 50.

Figure 3B:
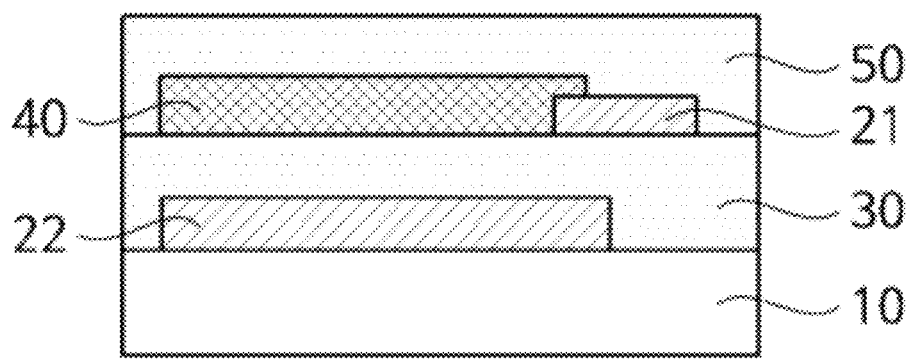

The element, the section of which is shown in FIG. 3b, is different from the element shown in FIG. 3a only in that the former element is obtained by forming a first electrode 21, i.e., a transparent electrode, and then a variable light transmittance layer 40.

Figure 3C:
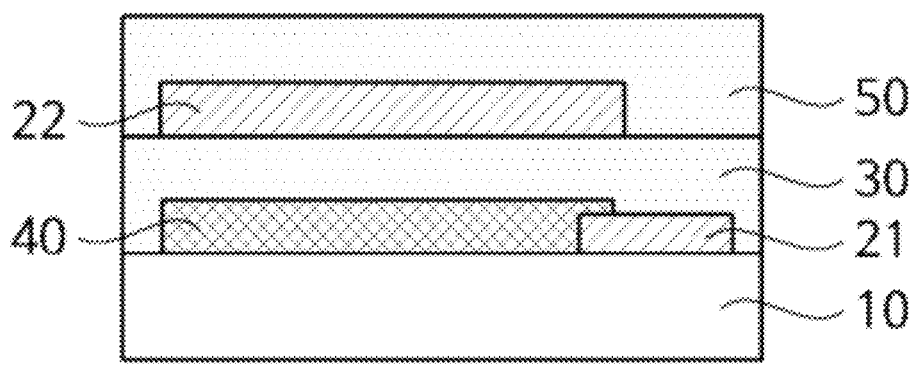

Furthermore, in the element the section of which is shown in FIG. 3c, a second electrode 22 to which a voltage is applied is located above a variable light transmittance layer 40 when a substrate 10 is viewed as the lowermost part, unlike in the element shown in FIG. 3b.

Figure 3D:
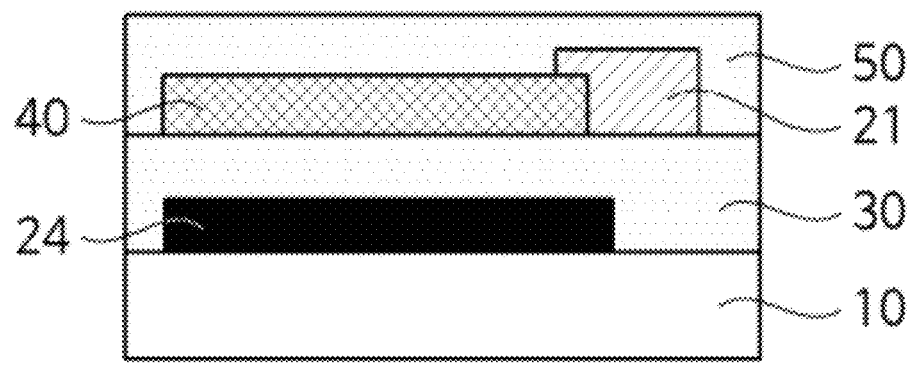
Figure 3E:
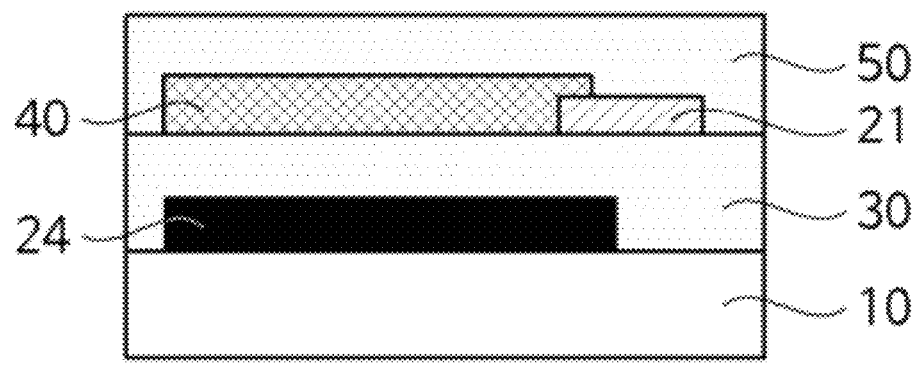
Figure 3F:
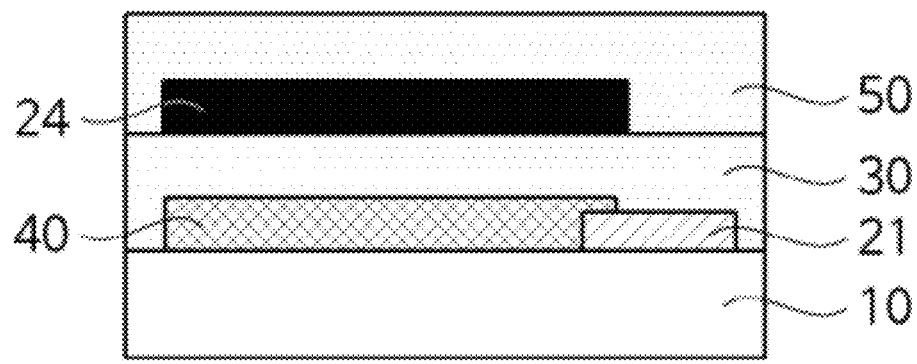

The elements, the sections of which are shown in FIGS. 3d to 3f, are different from the elements shown in FIGS. 3a to 3c in that the former elements have a second electrode 24, i.e., a reflective electrode, as a second electrode.

Figure 4A:
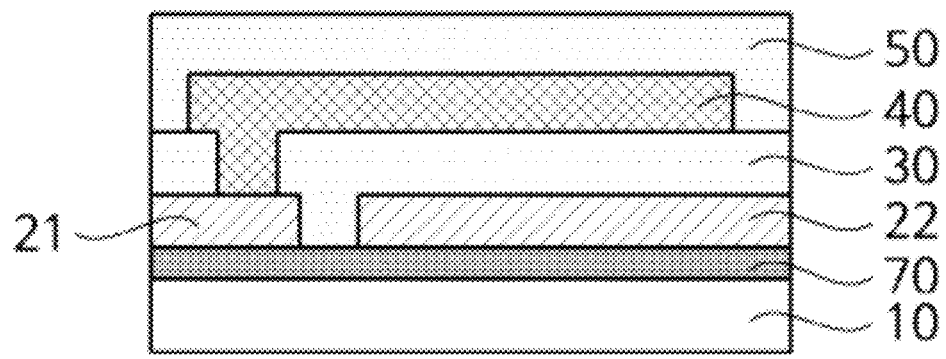
FIGS. 4a to 4c are sectional views of elements further including a lower coating layer and/or a reflective layer as an example of a variable light transmittance device according to the present invention.
Figure 4B:
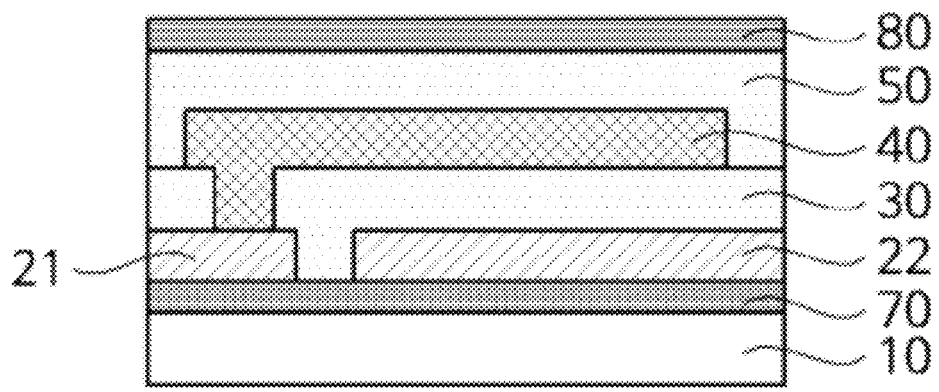
Figure 4C:
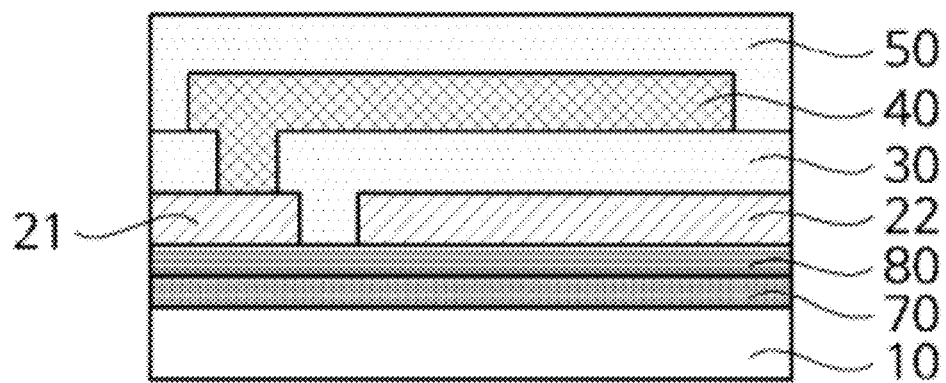

FIGS. 4a to 4c are sectional views of elements having a lower coating layer and/or a reflective film that may be included in an element structure when first and second electrodes are composed of transparent electrodes among various sectional structures of the variable light transmittance element according to the present invention.

The element, the section of which is shown in FIG. 4a, is a transmissive element that further includes a lower coating layer 70 interposed between a substrate 10 and an electrode layer including a first electrode 21 and a second electrode 22, unlike the element shown in FIG. 2a.

Furthermore, the element, the section of which is shown in FIG. 4b, further includes a reflective film 80 made of a metal capable of mirror reflection on an insulating film 50 than the element shown in FIG. 4a, and thus becomes a top reflective element that does not include a reflective electrode.

Furthermore, the element, the section of which is shown in FIG. 4c, further includes a reflective film 80 on a coating layer 70 than the element shown in FIG. 4a, and thus becomes a bottom reflective element that does not include a reflective electrode.

Although not shown in the drawings of the present application, first and second electrodes are composed of transparent electrodes in the element shown in FIG. 2c, it may further include a lower coating layer 70, or a lower coating layer 70 and a reflective film 80.

As described above, the variable light transmittance device according to the present invention may be implemented in various different forms as described above, and is not limited to the above-described embodiments.

The variable light transmittance element according to the above-described present invention induces a change in the localized surface plasmon resonance (LSPR) state by applying a voltage to both ends of the variable light transmittance stack structure including the electrode/insulation layer/metal nanoparticle-containing transparent semiconductor layer, and thus the light transmittance and color of the metal nanoparticle-containing transparent semiconductor layer may be freely changed. Accordingly, the variable light transmittance element may be used not only for color filters for conventional display devices, but also for transparent information display products such as smart windows, smart glasses, and the like.

INDUSTRIAL APPLICABILITY

The variable light transmittance element according to the present invention may freely change the light transmittance and color of the metal nanoparticle-containing transparent semiconductor layer by inducing a change in the localized surface plasmon resonance (LSPR) state, so that it may be used not only for color filters for conventional display devices but also for transparent information display products such as smart windows, smart glasses, and the like.

The invention claimed is:

1. A variable light transmittance element comprising a variable light transmittance structure, wherein the variable light transmittance structure comprises:
    a first electrode;
    a variable light transmittance layer made of a transparent semiconductor material in which metal nanoparticles are dispersed, and electrically connected to the first electrode;
    a second electrode; and
    an insulating layer interposed between the variable light transmittance layer and the second electrode.

2. The variable light transmittance element of claim 1, wherein the transparent semiconductor material is one or more oxides selected from Zn, In, and Sn.

3. The variable light transmittance element of claim 2, wherein the transparent semiconductor material further comprises at least one element selected from Si, Ge, Al, and Ga.

4. A color filter for a display device, the color filter comprising the variable light transmittance element set forth in claim 3.

5. A smart window comprising the variable light transmittance element set forth in claim 3.

6. A color filter for a display device, the color filter comprising the variable light transmittance element set forth in claim 2.

7. A smart window comprising the variable light transmittance element set forth in claim 2.

8. The variable light transmittance element of claim 1, wherein the metal nanoparticles are one metal or an alloy of two or more metals selected from Au, Ag, Cu, Al, Pt, Pd, Ni, Co, Fe, Mn, Cr, Mo, W, V, Ta, Nb, Hf, Zr, Ti, Zn, In, Sn, Sb, and Bi.

9. A color filter for a display device, the color filter comprising the variable light transmittance element set forth in claim 8.

10. A smart window comprising the variable light transmittance element set forth in claim 8.

11. The variable light transmittance element of claim 1, wherein the first and second electrodes are transparent electrodes or reflective electrodes.

12. A color filter for a display device, the color filter comprising the variable light transmittance element set forth in claim 11.

13. A smart window comprising the variable light transmittance element set forth in claim 11.

14. The variable light transmittance element of claim 1, wherein conductivity of the transparent semiconductor material included in the variable light transmittance layer is controlled by applying a voltage to the variable light transmittance stack structure, so that a localized surface plasmon resonance (LSPR) state of the metal nanoparticles is changed, thereby changing light transmittance of the variable light transmittance layer.

15. A color filter for a display device, the color filter comprising the variable light transmittance element set forth in claim 14.

16. A smart window comprising the variable light transmittance element set forth in claim 14.

17. The variable light transmittance element of claim 1, further comprising a transparent semiconductor layer interposed between the variable light transmittance layer and the first electrode.

18. A color filter for a display device, the color filter comprising the variable light transmittance element set forth in claim 17.

19. A smart window comprising the variable light transmittance element set forth in claim 17.

20. The variable light transmittance element of claim 1, wherein a substrate is included on one surface of the variable light transmittance structure, the first and second electrodes are transparent electrodes, and a lower coating layer interposed between the variable light transmittance structure and the substrate is further included.

21. The variable light transmittance element of claim 20, further comprising a reflective film, wherein the reflective layer is formed on a remaining surface of the variable light transmittance structure or between the variable light transmittance structure and the lower coating layer.

22. A color filter for a display device, the color filter comprising the variable light transmittance element set forth in claim 21.

23. A smart window comprising the variable light transmittance element set forth in claim 20.

24. A color filter for a display device, the color filter comprising the variable light transmittance element set forth in claim 20.

25. A smart window comprising the variable light transmittance element set forth in claim 21.

26. A color filter for a display device, the color filter comprising the variable light transmittance element set forth in claim 1.

27. A smart window comprising the variable light transmittance element set forth in claim 1.

\* \* \* \* \*